United States Patent
Ras et al.

(10) Patent No.: US 7,807,220 B2
(45) Date of Patent: Oct. 5, 2010

(54) BORON COATED ABRASIVES

(76) Inventors: Anine Hester Ras, 24 Third Avenue, Edenvale, 1609 (ZA); Geoffrey John Davies, 36 Boundary Road, Linden, Extension 3, Randburg, 2194 (ZA)

( * ) Notice: Subject to any disclaimer, the term of this patent is extended or adjusted under 35 U.S.C. 154(b) by 985 days.

(21) Appl. No.: 10/566,194

(22) PCT Filed: Jul. 27, 2004

(86) PCT No.: PCT/IB2004/002403

§ 371 (c)(1),
(2), (4) Date: Jun. 12, 2006

(87) PCT Pub. No.: WO2005/017227

PCT Pub. Date: Feb. 24, 2005

(65) Prior Publication Data

US 2006/0242911 A1    Nov. 2, 2006

(30) Foreign Application Priority Data

Aug. 15, 2003 (ZA) ................................. 2003/6374

(51) Int. Cl.
*B05D 7/00* (2006.01)
*C23C 16/00* (2006.01)

(52) U.S. Cl. ..................... 427/215; 427/212; 427/248.1

(58) Field of Classification Search ............. 427/248.1, 427/249.5, 250, 255.38
See application file for complete search history.

(56) References Cited

U.S. PATENT DOCUMENTS

| 1,897,214 | A | * | 2/1933 | Ridgway | ..................... 423/291 |
| 2,356,938 | A | * | 8/1944 | Lombard | ..................... 51/307 |
| 3,744,979 | A | | 7/1973 | Kalish | |
| 3,935,034 | A | | 1/1976 | Hayes | |
| 4,902,652 | A | | 2/1990 | Kume et al. | |
| 4,971,624 | A | | 11/1990 | Clark et al. | |
| 5,090,969 | A | * | 2/1992 | Oki et al. | ..................... 51/295 |
| 5,611,828 | A | * | 3/1997 | Celikkaya | ..................... 51/309 |
| 5,672,382 | A | | 9/1997 | Lux | |
| 6,478,887 | B1 | | 11/2002 | Sue et al. | |
| 6,524,357 | B2 | * | 2/2003 | Baldoni et al. | ..................... 51/297 |

FOREIGN PATENT DOCUMENTS

| DE | 41 39 956 | A | | 6/1993 |
| EP | 0 352 811 | A | | 1/1990 |
| EP | 0 517 460 | A | | 12/1992 |
| GB | 1 436 945 | | | 5/1976 |
| JP | 09-142932 | | | 6/1997 |
| JP | 09142932 | A | * | 6/1997 |
| ZA | 2001/07995 | A | | 5/2002 |
| ZA | 200107995 | A | * | 7/2002 |

OTHER PUBLICATIONS

Kim et al. Chemical vapor deposition of boron and boron nitride from decaborane (14), J. Vac. Sci. Technol. A 9 (4), Jul./Aug. 1989, pp. 2796-2799.*

* cited by examiner

*Primary Examiner*—David Turocy
(74) *Attorney, Agent, or Firm*—Frommer Lawrence & Haug LLP; Ronald R. Santucci

(57) ABSTRACT

A process forming boron coated abrasives, in particular boron coated abrasive particles, which may be used in saw blade segments, grinding wheels and other grit-containing tools. While the process is particularly suited to the coating of abrasive particles, it can be applied to any abrasives for use in grinding, cutting or polishing tools, or to such tools themselves. In the case of abrasive particles, these are mixed with boron and boric acid powder, in a suitable ratio, and furnaced at a temperature between 800 and 1200° C. for a length of time in an inert atmosphere sufficient to coat the particles.

17 Claims, No Drawings

BORON COATED ABRASIVES

This application is a 371 of PCT/IB2004/002403 filed on Jul. 27, 2004, published on Feb. 24, 2005 under publication number WO 2005/017227 A1 and claims priority benefits of South African Patent Application No. ZA 2003/6374 filed Aug. 15, 2003.

BACKGROUND OF THE INVENTION

This invention relates to boron coated abrasives, a process for their production, and to boron coated abrasives for use in saw blade segments, grinding wheels and other abrasive-containing tools.

Abrasive particles such as diamond and cubic boron nitride are commonly used in cutting, grinding, drilling, sawing and polishing applications. In such applications, abrasive particles are mixed with metal powder mixes, then sintered at high temperatures to form bonded cutting elements. Typical bond matrices contain iron, cobalt, copper, nickel and/or alloys thereof.

Common problems in applications are retention of particles in the bond matrix, and resistance against oxidative attack during the sintering process and the subsequent application.

These problems are commonly addressed by coating the abrasive particles with metals or alloys which bond chemically to the particle, and alloy to the bond matrix. Typically, chemical vapour deposition (CVD) or physical vapour deposition (PVD sputter coating) techniques are used. A disadvantage of the CVD technique is that it often requires the use of highly toxic chemical compounds. A disadvantage of the PVD technique, being a low temperature technique, is that the metal coating does not form a chemical bond with the grit particles.

U.S. Pat. No. 6,524,357 discloses a process for coating a superabrasive with a metal by heating the superabrasive and a coat-forming powder in an inert atmosphere. It is a requirement of this process that the coating powder contains a metal compound of which the metal is thermally reducible by the superabrasive.

The addition of boron oxide and/or boric acid to diamond powder to manufacture sintered diamond compacts at high pressure and high temperature in order to improve the strength of the compact, for use in cutting and drilling applications, is disclosed in JP 9142 932. Similarly, EP 0 352 811 describes the use of metal-coated superabrasives for the high pressure high temperature manufacture of superabrasive cutting elements and compacts.

U.S. Pat. No. 4,902,652 discloses a method for producing diamond compacts at high pressure high temperature (i.e. in the region where diamond is stable) by using coated diamond particles. Although boron is mentioned as one of the coatings, only conventional techniques of ion sputtering and ion plating are disclosed.

SUMMARY OF THE INVENTION

A process for producing a boron coated abrasive includes the steps of contacting the abrasive to be coated with a boron source, at a coating temperature of about 800° C. to about 1200° C. in an inert atmosphere, for a time sufficient to coat at least a portion of the abrasive.

The abrasive may be in any appropriate form including abrasive particles such as grit or granules, for example, larger abrasive bodies such as sheets or films of abrasive, for example, or even abrasive tools themselves such as cutting, grinding or polishing tools, for example.

In a preferred embodiment of the invention, abrasive particles are coated with boron by mixing the abrasive particles with a boron source, and heating the mixture at the coating temperature in an inert atmosphere for a time sufficient to coat at least a portion of the abrasive particles.

The boron source preferably comprises boron powder, in particular in combination with boric acid. The ratio of boron powder to boric acid is such as to optimise the available boron for coating the abrasive particles, and is typically 1:0 to 1:1, preferably about 1:0.7, by weight.

The final boron coat may be boron, boron carbide, boron oxide or a combination of any of these.

The process is preferably carried out at a temperature of about 800° C. to about 1150° C., in particular at a temperature of about 1100° C. to about 1150° C.

The process preferably includes a preheating step, which comprises heating the abrasive and boron source, which in the case of abrasive particles would typically be a mixture of abrasive particles and boron source, incrementally to a temperature of about 250° C. to about 500° C., preferably about 300° C., and maintaining them at that temperature for a period of about 15 minutes to about 45 minutes, in particular about 30 minutes, in order to soften and melt the boron source.

The abrasive and boron source are preferably incrementally heated to the coating temperature, typically at about 5° C./minute to about 15° C./minute, in particular about 10° C./minute, to a coating temperature of at least 800° C., preferably 1150° C.

The abrasive and boron source are preferably heated at the coating temperature for at least 30 minutes, in particular for 3 hours, most particularly for at least 6 hours.

The ratio of abrasive to boron source, particularly with regard to abrasive particles, is preferably about 1:0.2 to about 1:20, in particular about 1:2, by weight.

The abrasive is preferably diamond or cubic boron nitride.

The invention extends to boron coated abrasives, in particular boron coated abrasive particles, preferably as manufactured by the process of the invention.

The invention also extends to a tool, in particular a cutting, grinding or polishing tool, which is either boron coated or comprises sintered boron coated abrasive particles in an appropriate bond matrix.

DESCRIPTION OF EMBODIMENTS

The present invention is directed at forming boron coated abrasives, in particular boron coated abrasive particles, which may be used in saw blade segments, grinding wheels and other grit-containing tools.

In a preferred embodiment of the invention, the abrasive is provided in the form of abrasive particles. However, it is to be understood that the coating method of the invention may be applied to any abrasives for use in grinding, cutting or polishing tools, or to such tools themselves. In the case of abrasive particles, these are mixed with boron and boric acid powder, in a suitable ratio, and furnaced at a temperature between 800 and about 1200° C. for a length of time in an inert atmosphere sufficient to coat the particles. After cooling, the coated abrasive particles are separated from the powders by any convenient method, such as screening, flotation or elutriation. The coated particles are washed to remove any adhering powder particles.

By an "inert" atmosphere is meant that the atmosphere is free of contaminants that may interfere with the process. An inert atmosphere may be achieved by passing an inert gas through the reaction vessel or by subjecting the reaction vessel to a vacuum.

Boron (a non-metal) offers significant advantages as a coating for abrasives. The boron substitutes for carbon in the diamond lattice, thereby increasing the resistance of the diamond to oxidative and chemical attack during saw segment manufacture. Boron also alloys with Co and diffuses into iron bonds to improve mechanical properties of the bond material, such as creep strength, for example.

Although the method described here is simple: grit is mixed with boron and boric acid powder, and heated to temperatures in the range of 800 to 1200° C. for a period of time in an inert atmosphere, it is very effective. No toxic chemicals are used. There is also a surprising improvement observed in the coating obtained when the coating temperature is adjusted to 1150° C., which appears to be the optimum temperature for carrying out the process of the invention.

Where the abrasive is in a form which is too large to form a mixture with the boron source, any other appropriate method of contacting the abrasive with the boron source may be applied. For instance, in the case of an abrasive tool, this may be immersed in the boron source to provide contact. Alternatively, the boron source may be provided in a separate holder or container and once the appropriate coating temperature is reached, the boron source is vaporized and is able to contact the abrasive in an appropriate manner to coat it.

The invention will now be illustrated by way of the following non-limiting examples.

EXAMPLE 1

32 g of boric acid ($H_3BO_3$) was added to 46 g boron powder, and mixed in a Turbula mixer for 1.5 hours. 2 g of this mix was added to 1 g of diamond grit (ex Element Six, SDB1100, 35/45 US mesh) in a closed plastic container and shaken by hand for 3 minutes to mix. The mix was placed in an alumina boat in a tube furnace. The temperature was increased to 300° C. in 1 hour (5° C./minute), held at 300° C. for 0.5 hours, then increased to 1100° C. in 1 hour 20 minutes (10° C./minute), held at 1100° C. for 3 hours, then allowed to cool naturally. The powder was separated from the boron-coated diamond particles by screening and washing with water. Some particles were completely coated with matte grey coating, and some (111) faces were not coated at all.

EXAMPLE 2

The same procedure was followed as in Example 1, except that the dwell time at 1100° C. was doubled to 6 hours. The coating appeared slightly improved in terms of coverage, but there were still some uncoated (111) faces, and some entirely uncoated particles.

EXAMPLE 3

The same procedure was followed as in Example 2, except that the dwell temperature was increased by 50° C. to 1150° C. The resulting coating had a very rough texture, contained boron, boron oxide and boron carbide, and consisted of crystalline, star-shaped structures. The particles were completely covered, with excellent coverage even at the edges and corners of the particles. The thickness of the coating was in the range of 1-2 μm.

The invention claimed is:

1. A process for producing a boron coated abrasive, the process including the steps of contacting the abrasive to be coated with a boron source comprising boron powder combined with boric acid, at a coating temperature of about 800° C. to about 1200° C. in an inert atmosphere, for a time sufficient to coat at least a portion of the abrasive, and separating the abrasive coated with boron from the boron source.

2. A process according to claim 1, wherein the abrasive is in the form of abrasive particles, larger abrasive bodies, or abrasive tools.

3. A process according to claim 1, wherein the ratio of boron powder to boric acid is 1:0 to 1:1 by weight.

4. A process according to claim 3, wherein the ratio of boron powder to boric acid is about 1:0.7 by weight.

5. A process according to claim 1, wherein the process is carried out at a temperature of about 800° C. to about 1150° C.

6. A process according to claim 5, wherein the process is carried out at a temperature of about 1100° C. to about 1150° C.

7. A process according to claim 6, wherein the process is carried out at a temperature of about 1150° C.

8. A process according to claim 1, wherein the process includes a preheating step, the preheating step comprising heating the abrasive and boron source incrementally to a temperature of about 250° to about 500° C., and maintaining them at that temperature for a period of about 15 minutes to about 45 minutes.

9. A process according to claim 8, wherein the preheating step comprises heating the abrasive and boron source incrementally to a temperature of about 300° C., and maintaining them at that temperature for a period of about 30 minutes.

10. A process according to claim 8, wherein the abrasive and boron source are incrementally heated to the coating temperature at about 5° C./minute to about 15° C./minute.

11. A process according to claim 10, wherein the abrasive and boron source are incrementally heated to the coating temperature at about 10° C./minute.

12. A process according to claim 1, wherein the abrasive and boron source are heated at the coating temperature for at least 30 minutes.

13. A process according to claim 12, wherein the abrasive and boron source are heated at the coating temperature for at least 3 hours.

14. A process according to claim 13, wherein the abrasive and boron source are heated at the coating temperature for at least 6 hours.

15. A process according to claim 1, wherein the ratio of abrasive to boron source is about 1:0.2 to about 1:20 by weight.

16. A process according to claim 15, wherein the ration of abrasive to boron source is about 1:2 by weight.

17. A process according to claim 1, wherein the abrasive is diamond or cubic boron nitride.

* * * * *